United States Patent [19]

Kindt

[11] Patent Number: 4,606,235

[45] Date of Patent: Aug. 19, 1986

[54] GENEVA DRIVE

[75] Inventor: Robert J. Kindt, Rochester, N.Y.

[73] Assignee: Eastman Kodak Company, Rochester, N.Y.

[21] Appl. No.: 537,202

[22] Filed: Sep. 29, 1983

[51] Int. Cl.⁴ .............................................. F16H 55/17
[52] U.S. Cl. ........................................ 74/113; 74/436; 74/112
[58] Field of Search ................. 74/112, 113, 148, 149, 74/150, 154, 155, 436, 84 R; 414/905

[56] References Cited

U.S. PATENT DOCUMENTS

| | | |
|---|---|---|
| 1,342,170 | 6/1920 | Hill . |
| 2,307,112 | 1/1943 | Cunningham ........................ 74/436 |
| 2,956,452 | 10/1960 | Dever .................... 74/155 X |
| 3,134,267 | 5/1964 | Shannon .................... 74/150 X |
| 3,434,360 | 3/1969 | Sobotta .................... 74/112 |
| 3,505,889 | 4/1970 | Anderson .................... 74/436 X |
| 3,527,366 | 9/1970 | Gamberim . |
| 3,605,517 | 9/1971 | Seragnoli . |
| 3,638,510 | 2/1972 | Staller . |
| 3,643,816 | 2/1972 | Jacobsen . |
| 3,706,235 | 12/1972 | Duncan .................... 74/112 X |
| 3,827,312 | 8/1974 | Bristol et al. . |
| 3,853,015 | 12/1974 | Bertozzi et al. .................... 74/112 |
| 4,037,493 | 7/1977 | Freer . |
| 4,215,588 | 8/1980 | Komori et al. .................... 74/113 |

Primary Examiner—Larry Jones
Attorney, Agent, or Firm—Lawrence P. Kessler

[57] ABSTRACT

A mechanism for prepositioning the input shaft of a bidirectional Geneva drive to effect incremental rotation of the output shaft of the Geneva drive, upon rotation of the input shaft, at a predictable time. The Geneva drive has an input shaft rotatable in opposite directions through active angles which respectively effect rotation of the output shaft. The prepositioning mechanism comprises a member, coupled to the input shaft, and having a pair of spaced, oppositely directed abutment surfaces. A locating pawl is selectively moved to a position to be engaged by one abutment surface when the input shaft is rotated in one direction and the other abutment surface when the input shaft is rotated in the opposite direction to angularly preposition the input shaft at a location from which rotation of such input shaft one of through its respective active angles is accurately predictable. The locating pawl is thereafter moved to disengage the engaged abutment surface so that the input shaft is rotatable through such respective active angle to incrementally rotate the output shaft at a predictable time based on movement of the pawl.

5 Claims, 7 Drawing Figures

GENEVA DRIVE

BACKGROUND OF THE INVENTION

This invention relates generally to a Geneva drive, and more particularly to an improved Geneva drive where the input shaft is accurately prepositioned to impart rotation to the output shaft at a predictable time upon rotation of the input shaft.

A well known mechanism for converting rotary motion into intermittent or stepped rotary motion is commonly referred to as a Geneva drive. Geneva drives are particularly applicable for use in machines in which incremental movement of a part of such machine in one direction, or in reversible directions, is desired. Such incremental movement is effected by the intermittent or stepped rotary motion of the output shaft of the Geneva drive. To accomplish such output shaft motion, the Geneva drive includes an input member, rotatable about an axis, having at least one activating element. Upon rotation of the input member, the element is sequentially engaged with radial notches formed in a member concentrically mounted on the output shaft to incrementally rotate the output shaft.

To ensure that the output shaft is smoothly rotated only during the periods of engagement of the element with the notches, the member mounted on the output shaft includes concave portions formed between the radial notches. Such concave portions are engageable by a mating cylindrical surface portion (concentrically mounted on the input member) when the element is not in engagement with the radial notches. The engagement of the concave portions and mating cylindrical surface portion locks the output shaft against rotation (see, for example, U.S. Pat. Nos. 3,605,517, issued Sept. 20, 1971 in the name of Seragnoli, or 3,638,510, issued Feb. 1, 1972, in the name of Staller). While such Geneva drive arrangements provide smooth incremental movement of the output shaft, they do not provide for repeatable and predictable alignment of the element with the notches to establish an accurate relationship therebetween where incremental rotation of the output shaft can be accomplished at a readily predictable time.

SUMMARY

This invention is directed to a mechanism for prepositioning the input shaft of a bidirectional Geneva drive to effect incremental rotation of the output shaft of the Geneva drive, upon rotation of the input shaft, at a predictable time. The Geneva drive has an input shaft rotatable in opposite direction through active angles which respectively effect rotation of the output shaft. The prepositioning mechanism comprises a member, coupled to the input shaft, and having a pair of speed, oppositely directed abutment surfaces. A locating pawl is selectively moved to a position to be engaged by one abutment surface when the input shaft is rotated in one direction and the other abutment surface when the input shaft is rotated in the opposite direction to angularly preposition the input shaft at a location from which rotation of such input shaft through one of its respective active angles is accurately predictable. The locating pawl is thereafter moved to disengage the engaged abutment surface so that the input shaft is rotatable through such respective active angle to incrementally rotate the output shaft at a predictable time based on movement of the pawl.

The invention, and its objects and advantages, will become more apparent in the detailed description of the preferred embodiment presented below.

BRIEF DESCRIPTION OF THE DRAWINGS

In the detailed description of the preferred embodiment of the invention reference is made to the accompanying drawings, in which.

DESCRIPTION OF PREFERRED EMBODIMENT

Figure 5:
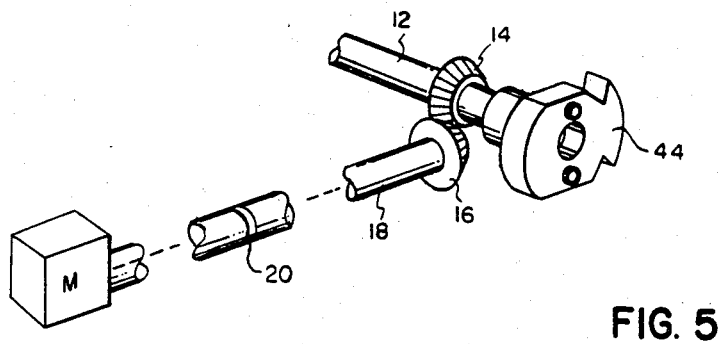
FIG. 5 is a view, in perspective, of the drive for the input shaft of the Geneva drive including the abutment member of the input shaft prepositioning mechanism according to this invention.

Referring now to the accompanying drawings, an exemplary Geneva drive 10 is shown in FIGS. 1 through 4. While such Geneva drive 10 is described hereinbelow for a complete understanding of the input shaft prepositioning mechanism according to this invention, such prepositioning mechanism is of course suitable for use with other Geneva drives. The Geneva drive 10 includes an input shaft 12 and an output shaft 22. A bevel gear 14 is mounted on the input shaft 12 (see FIG. 5). The gear 14 meshes with a bevel gear 16 mounted on a drive shaft 18. The drive shaft 18 is, for example, coupled to a reversible motor M through a torque limiting clutch 20 to rotate the input shaft in either direction about its longitudinal axis (clockwise or counter-clockwise in FIGS. 1–4). Such rotation of the input shaft in either direction enables the output of the Geneva drive 10 to be bidirectional.

In order for rotation of the input shaft 12 of the Geneva drive 10 to incrementally rotate the output shaft 22 in either direction, the input shaft includes a member 24 concentrically mounted on such shaft for rotation therewith; and, the output shaft 2 includes a member 34 mounted on such shaft for rotation therewith and cooperating with the member 24. The member 24 carries an activating element 26 radially spaced from the longitudinal axis of the input shaft 12, and a locking element 28 concentric with the input shaft 12. The locking element has a peripheral surface including a cylindrical portion 30 and a concave portion 32. The member 34 is, for example, cruciform in shape having a plurality of arms 36 interconnected by concave portions 38. Radial slots 40 are respectively formed in the arms 36. The radius of curvature of each of the concave portions 38 are substantially equal to the radius of curvature of the cylindrical portion 30. Further, the longitudinal axes of the shafts 12 and 22, upon which members 24 and 34 are respectively mounted, are spaced apart a distance such that the cylindrical portion 30 is selectively mateable with the concave portions 38 and the element 26 is receivable within the radial slots 40.

In operation of the Geneva drive 10, when the input shaft 10 is rotated by motor M in a clockwise direction (when viewed in FIG. 1), the member 24 is rotated clockwise. The element 26 is received in one of the radial slots 40 of the member 34 and engages the side wall of such slot to rotate the member 34 (and thus the output shaft 22) counterclockwise. The depth of the radial slot is sufficient to accept the element 26 over the complete angle of rotation of the member 24. In the illustrative embodiment where the member 34 has four arms 36, the angle of rotation over which the element 26 is in engagement with the slot 40 is 90° (e.g., between the position shown in FIG. 1 and the position shown in FIG. 3). Such angle of rotation is referred to as the active angle of rotation of the input shaft 2, and results in a corresponding incremental angle of rotation of the output shaft 22. It is, of course, apparent that the active angle of rotation of the input shaft is dependent upon the number of arms of the member mounted on the output shaft (e.g. eight arms yields an active angle of rotation of 45°).

Figure 1:
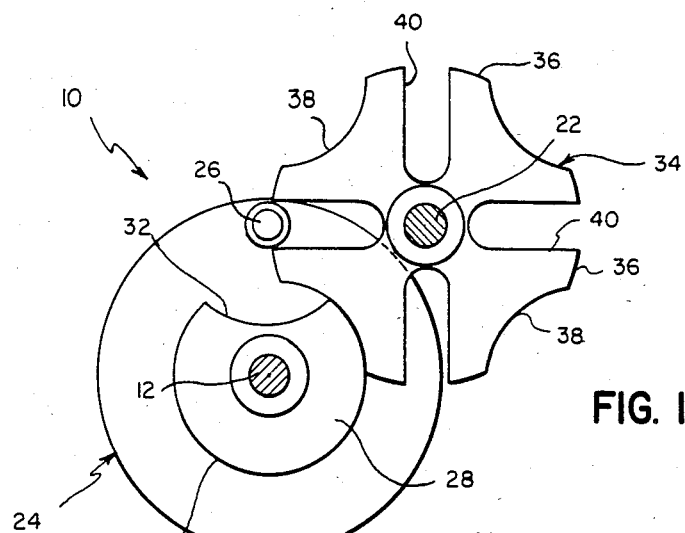
FIGS. 1 through 4 are side elevational views of an exemplary Geneva drive with its components at various operative angular positions.
Figure 3:
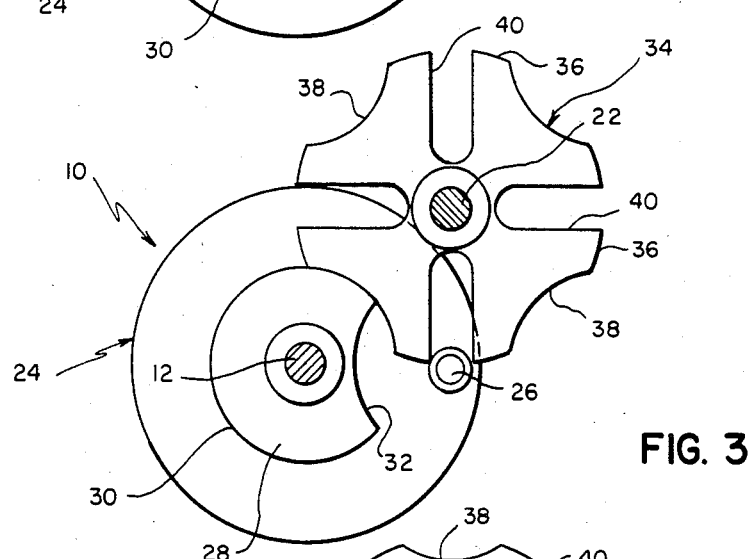
Figure 2:
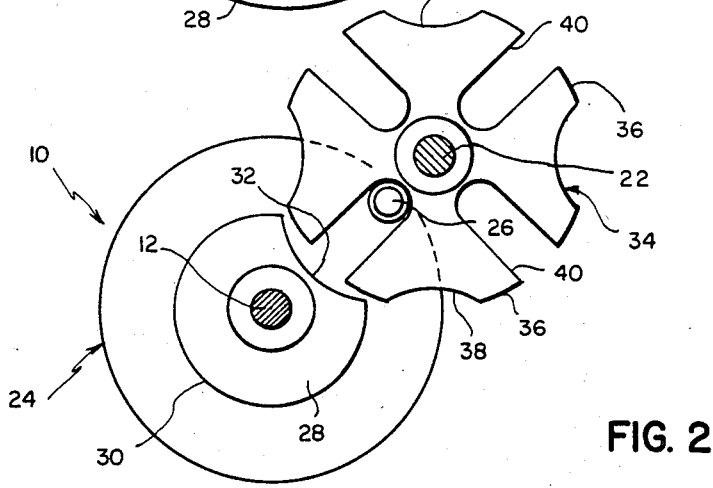
Figure 4:
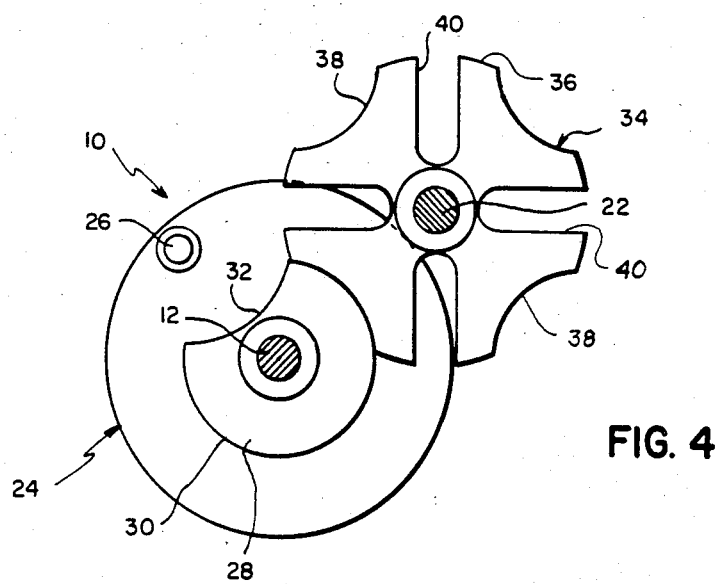

During the incremental rotation of the output shaft 22, the arm 36 having the slot 40 in which the element 26 is received is opposite the concave portion 32 of the locking element 28 (see FIG. 2). This enables the member 34 to be freely rotated. However, as the element 26 leaves the slot 40, the cylindrical portion 30 of the locking element 28 is rotated into mating engagement with a concave portion 38 of the member 34 (see FIG. 4) and remains in such engagement until the element 26 is repositioned relative to the next radial slot 40. Thus, as the shaft 12 is rotated to reposition the element 26, the member 34 (and shaft 22) is locked against rotation. The angle through which the shaft 12 rotates while the shaft 22 is locked is, in this illustrative embodiment, 270°. If the input shaft 12 is stopped during this degree of rotation, its restart does not immediately result in the rotation of output shaft 22; that is, the input shaft must complete the remainder of its 270° of rotation before it rotates through its active angle. As a result, the start (or period) of rotation of the output shaft 22 cannot always be accurately predicted.

Figure 6:
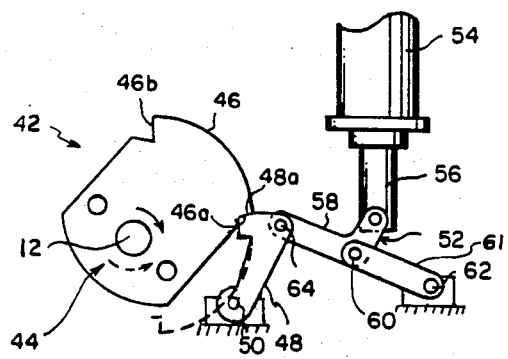
FIGS. 6 and 7 are side elevational views of the input shaft prepositioning mechanism according to this invention, in differing operative positions.
Figure 7:
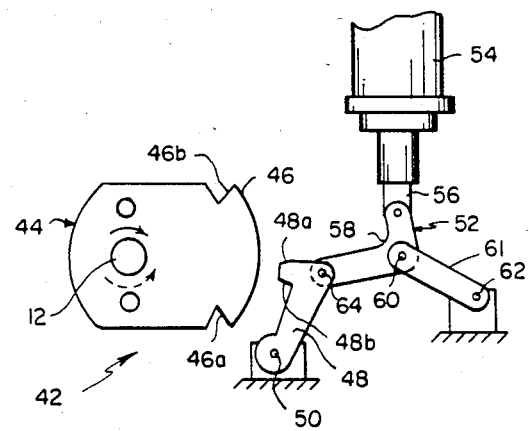

In some applications where Geneva drives are used, accurately predicting the start or period of rotation of the output shaft is important. In order to accurately predict the start or period of rotation of the output shaft 22, this invention provides a mechanism 42 (best shown in FIGS. 6 and 7) for angularly prepositioning the input shaft 12 at a location from which rotation through its active angle, for incremental rotation of the output shaft 22, is readily predictable. The mechanism 42 includes an abutment member 44, a locating pawl 48, and a pawl actuator 52. The abutment member 44 is mounted on the input shaft 12 for rotation therewith, and has a lobe 46 defining abutment surfaces 46a, 46b. The locating pawl 48 is mounted for selective movement about a fixed pivot point 50 into and out of the path of the lobe 46 as the lobe rotates with the shaft 12. When the pawl 48 is in the path of the lobe 46, the surface 48a of the pawl is located for engagement with abutment surface 46a upon clockwise rotation of the shaft 12; and alternatively, the surface 48b is located for engagement with abutment surface 46b upon counterclockwise rotation of the shaft 12. The abutment surfaces 46a, 46b are spatially related to member 24 (and input shaft 12) such when they are respectively engaged with the locating pawl 48, the shaft 12 is angularly prepositioned at a location from which rotation of such shaft through its respective active angles is predictable; i.e., immediately upon further rotation, or after a predetermined degree of rotation of the input shaft.

The pawl actuator 52 includes a solenoid 54 having an extensible armature 56 connected to a toggle link 58. The toggle link 58 is, in turn, connected medially to a pivot pin 60 at one end of a link 61, mounted for pivotal movement about a pivot pin 62, and to the locating pawl 48 by a pivot pin 64. When the solenoid 54 is activated to extend the armature 56, the link 61 constrains the toggle link 58 to move in a direction to urge the locating pawl 48 into the path of the lobe 46 of the abutment member 44 (see FIG. 6). The orientation of the toggle link 58 and link 61 relative to the pawl 48, with the armature 56 extended, prevents the pawl from moving out of its path blocking position. On the other hand, when the solenoid is activated to retract the armature 56, the link 60 constrains the toggle link 58 to move in a direction to urge the locating pawl 48 out of the path of the lobe 46 (see FIG. 7).

During operation of the Geneva drive 10, the solenoid 54 of the pawl actuator 52 is activated to position the locating pawl 48 in the path of lobe 46 of the abutment member 44. The motor is then activated to rotate the shaft 18 in either its clockwise or counterclockwise direction depending on the desired direction of incremental rotation of the output shaft 22 of the Geneva drive 10. If, for example, the output shaft 22 is to be rotated counterclockwise, the shaft 18 is rotated by the motor M in the direction to rotate the input shaft 12 clockwise when viewed in FIGS. 1 to 4. Such rotation of shaft 12 rotates the abutment member 44 until the abutment surface 46a engages surface 48a of locating pawl 48. The locating pawl 48 prevents shaft 12 from further rotation as the motor M continues to function, the motor being protected from damage by the slip clutch 20. With abutment surface 46a in engagement with surface 48a, shaft 12 (and member 24) is angularly prepositioned at the location (see FIG. 1) from which rotation of such shaft through its active angle is predictable.

At the predetermined time when it desired to incrementally rotate the output shaft 22, solenoid 54 is activated to retract the locating pawl 48 from the path of the lobe 46. The abutment member 44 is thus free from its engagement with the locating pawl 48, and the input shaft 12 (under the influence of motor M) is rotated through its active angle whereby element 26 acts on member 34 to effect counter-clockwise incremental rotation of the output shaft 22. As is readily appreciated, such incremental rotation occurs at an accurately predicatable time based on the retraction of the pawl 48. After the input shaft 12 has rotated through its active angle, the solenoid 54 is activated to return the locating pawl 48 into the path of the lobe 46 to provide for subsequent prepositioning of the input shaft. The procedure of positioning the pawl 48 to preposition the input shaft 12 and then releasing the input shaft for rotation through its active angle is repeated as long as timed incremental rotation of the output shaft 22 is desired.

Of course, if it is desired to incrementally rotate the output shaft 22 clockwise, the rotation of shafts 18 and 12 are merely reversed, while the operation of the solenoid 54 for effecting positioning of the locating pawl 48 continues in the above described manner. This reversed rotation brings abutment surface 46b of lobe 46 into engagement with the surface 48b of locating pawl 48 to angularly preposition shaft 12 at the location from which rotation of such shaft through its active angle, to incrementally rotate the output shaft 22 clockwise, is predictable.

Furthermore, reversal of rotation of the output shaft 22, between clockwise and counterclockwise incremental rotation (when viewed in FIGS. 1-4), can be readily effected between incremental steps of such shaft without affecting the timing of such incremental steps. Such reversal is accomplished merely by reversing the rotation of the motor M subsequent to rotation of the input shaft 12 through its active angle in one direction. Reversal of the motor M reverses rotation of the input shaft 12 to bring the abutment surface of the lobe 46, opposite from the abutment surface engaged by the locating pawl 48 on rotation in such one direction, into engagement with the locating pawl. The input shaft 12 is thus angularly prepositioned at the location from which rotation of such shaft in such opposite direction through its active angle, to appropriately increment the output shaft 22, is predictable.

The invention has been described in detail with particular reference to a preferred embodiment thereof, but it will be understood that variations and modifications can be effected within the spirit and scope of the invention.

I claim:

1. In a bidirectional Geneva drive having a rotatable output shaft and an input shaft that is selectively rotatable in opposite directions through active angles which respectively effect rotation of said output shaft, means for prepositioning said input shaft for predictable rotation through either of its active angles, said prepositioning means comprising:

a member coupled to said input shaft, said member including a pair of spaced, oppositely directed, abutment surfaces, means, engageable with one of said surfaces during rotation of said input shaft in one direction and the other of said surfaces during rotation of said input shaft in the opposite direction, for locating said input shaft at positions from which rotation of said input shaft through one of its respective active angles is predictable; and means for selectively actuating said locating means to (i) engage one or the other of said surfaces and locate said input shaft at one of such respective positions, and (ii) disengage such surface to enable said input shaft to thereafter rotate through its respective active angle to rotate said output shaft at a predictable time.

2. The invention of claim 1 wherein said member is mounted for rotation with said input shaft to rotate said abutment surface about a path, and said stopping means comprises a pawl movable into such path.

3. The invention of claim 2 wherein said actuating means comprises a solenoid including an extensible armature, said armature being coupled to said pawl, whereby extension of said armature moves said pawl into the path of said abutment surfaces and retraction moves said pawl out of such path.

4. The invention of claim 2 wherein said actuating means comprises a solenoid having an extensible armature, a toggle link coupled adjacent to one end to said armature and adjacent to the other end to said pawl, and means for constraining movement of said toggle link, whereby upon extension of said armature said toggle link is moved to locate said pawl into the path of said abutment surfaces and, upon retraction, said toggle link is moved to locate said pawl out of such path.

5. The invention of claim 4 wherein said constraining means comprises a link mounted for pivotable movement adjacent to one end about a pivot point and coupled adjacent to the other end to tne toggle link between the ends of such toggle link, said link being oriented about such pivot point, when said armature is extended, to locate said toggle link where movement of said pawl out of the path of said abutment surfaces is prevented.

* * * * *